United States Patent [19]

Kraicar et al.

[11] Patent Number: 4,489,360
[45] Date of Patent: Dec. 18, 1984

[54] CIRCUIT FOR AUTOMATICALLY CLOSING A BACKUP REMOTE FEED LOOP

[75] Inventors: Heinz Kraicar, Poecking; Alfred Ziegler, Munich, both of Fed. Rep. of Germany

[73] Assignee: Siemens Aktiengesellschaft, Berlin & Munich, Fed. Rep. of Germany

[21] Appl. No.: 477,975

[22] Filed: Mar. 23, 1983

[30] Foreign Application Priority Data

Mar. 29, 1982 [DE] Fed. Rep. of Germany ....... 3211497

[51] Int. Cl.³ ........................................... H01H 47/32
[52] U.S. Cl. .................................... 361/187; 361/210; 361/194
[58] Field of Search .................. 361/187, 210, 92, 75, 361/194

[56] References Cited

PUBLICATIONS

Fehlerortung in Tf-Kabelstrecken mit Unterflurverstarkern, Siemens Zeitschrift 48 (1974) supplement "Nachrichten-Ubertragungstechnik", pp. 109-111.

Primary Examiner—Reinhard J. Eisenzopf
Attorney, Agent, or Firm—Hill, Van Santen, Steadman & Simpson

[57] ABSTRACT

A circuit for automatically closing a backup remote feed loop upon interruption of the remote feed loop of a remote feed device for supplying electrical users by means of DC series feed has a holding winding and a response winding disposed in a longitudinal arm of a switching relay, the contact of the switching relay being disposed in a cross-arm in series with a choke coil. The relay operates with a very low voltage drop at the holding winding and occupies a relatively small volume. The circuit can be utilized as an auxiliary relay controlled by means of a delay circuit for selectively cutting in and cutting out the response winding of the relay, particularly in remote feed repeaters or regenerators.

10 Claims, 5 Drawing Figures

CIRCUIT FOR AUTOMATICALLY CLOSING A BACKUP REMOTE FEED LOOP

BACKGROUND OF THE INVENTION

1. Field of the Invention

The present invention relates to a circuit for automatically closing an interrupted remote feed loop, and in particular to a means for automatically closing the interrupted loop in front of the interrupt location in a remote feed loop for a means for supplying electrical users with DC series current.

2. Description of the Prior Art

A circuit is described in Siemens Zeitschrift 48 (1974) supplement "Nachrichten-Übertragungstechnik", at page 111 (particularly FIG. 5) for automatically closing an interrupted remote feed loop in front of the interrupt location. This circuit includes a series arm having a holding winding of a switching relay and a response winding which can be switched on given non-actuation of the relay, and which can be swtiched off given actuation of the relay. The relay also has a cross or shunt arm having a break contact, a choke, and a series connection including a resistor. The relay is actuated by current flowing in the remote feed loop which is a fraction of the rated value of the remote feed current. The relay changes state given a reduction of the remote feed current below a prescribed value. An RC connection is connected in parallel with the break contact.

Remote current supplied intermediate regenerator locations or repeater locations for a long distance communication system may contain so-called switch auxiliaries which perform the function of re-closing the remote feed circuit in front of the faulty repeater field in case of a line interruption. Location of the site of the fault can then be undertaken by any known fault locating method included within the system.

For this purpose, it is known from the above publication to employ switching relays having a break contact in the switch auxiliaries, the coil of the switching relay being traversed in normal operation by the remote feed current which maintains the contact open. In the event of a line interruption, the contact closes and connects both remote feed current paths to one another. The contact is in the form of a change-over contact having an off side which switches the cross or shunt connection and having a working side which, after response of the switching relay, shorts a portion of the excitation winding of the relay serving as a response winding, so that only a portion of the winding, serving as a holding winding, is then still effective.

In such a conventional switch auxiliary, the holding voltage drop at the relay coil must be significantly lower than the operating voltage of the regenerator or repeater, which in practice requires response powers of, for example, less than 100 mW.

A high remote feed voltage of, for example, 1200 volts may be continuously adjacent between the opened contacts. When closing, the section capacitances charged to this voltage, which may be on the order of several microfarads, must be able to discharge. At the other extreme, even after years of non-actuation, the contacts must reliably close even at low voltages of, for example, less than 20 volts.

SUMMARY OF THE INVENTION

It is an object of the present invention to provide a circuit for automatically closing an interrupted remote feed loop having a voltage drop which is as low as possible at the holding winding and which can be accommodated in a very small space.

In conventional switch auxiliaries, a low voltage drop at the holding winding requires relays exhibiting contacts with a relatively high breaking capacity and a sufficiently large winding space for the excitation winding. Both the type and size of the switching relay as well as for a choke necessary for protection of the contact determine the dimensions of the space required in the repeater or regenerator housing for the switch auxiliary. Thus, accommodation of the switch auxiliary in a smaller volume can only be achieved with sacrifice to the electrical demands.

The above object of a switch auxiliary having a low voltage drop at the holding winding which can still be accommodated in a small space is inventively achieved in an auxiliary wherein the response winding of the switching relay is switched on by means of a first auxiliary relay connected to a resistor via a first delay circuit and wherein a "make" contact of the first auxiliary relay is disposed in series with the response winding for the switching relay, and wherein a series connection consisting of the "make" contact and the response winding is bridged by a diode having polarity aligned in the conducting direction for the remote feed current. In order to achieve a low volume, the auxiliary relay is preferably in the form of a relay with a dual-in-line housing.

The advantages derived by the above structure is that all contacts are in the form of continuously open single contacts. Additional component relay associated with the auxiliary relay and the delay circuit has practically no influence on the outage rate of the switch auxiliary, because all of these components are substantially current-free and voltage-free during undisrupted operation of the transmission link.

If as small as possible a relay, as well as a choke coil which is as small as possible, are employed for the contact, the problem may arise of the contacts of a small relay with low making and/or breaking capacity requiring a higher inductance for their protection, and an increase in the number of windings of the choke given a low structural size signifies a substantial increase in the winding resistance. Such an approach would, however, result in an unacceptably high increase in the leakage power in the cross-arm of the switch auxiliary during a line interruption.

In order to overcome this problem, the circuit disclosed and claimed herein has a make contact of a second auxiliary relay connected to the resistor via a second delay line disposed in parallel to the choke. The delay circuits of the first and second auxiliary relays are dimensioned such that the delay time of the first delay circuit is greater than that of the second delay circuit, so that all contacts of the relay are in the form of single contacts which are normally open.

When the remote feed loop is interrupted, the switching relay of the switch auxiliary disposed in front of the interrupt location drops out. The remote current feed flows through the cross-arm and a corresponding voltage drop occurs across the resistor. After exploration of the delay time of the first delay circuit, the choke is shorted and can demagnetize. Subsequently, the response winding of the switching relay is switched on after the delay time of the second delay circuit.

The circuit constructed as described above exhibits a relatively small volume but produces a particularly low voltage drop (and exhibits a correspondingly low leakage power) both for the operational remote feed loop as well as a shorted remote feed loop in the case of an interruption.

The space required for the auxiliary relays and components of the delay circuits can be maintained small by utilizing small components and relays (such as miniature relays and choke coils commercially available) such that even with these additional components, a lower total volume and thus better space exploitation are achieved with the relay disclosed herein than are exhibited by conventional switch auxiliaries.

In a further embodiment of the invention, the circuit has two diode branches (the diodes being connected with opposite polarity) which are connected in parallel to a series connection formed by the holding winding and the response winding of the switching relay and of the make contact of the first auxiliary relay. The diode branch connected with polarity in the same conducting direction as the remote feed current includes a plurality of diode paths such that, given the rated value of the remote feed current, the voltage at the holding winding of the switching relay is limited by this diode branch.

It is also preferable to dimension the presistence of the holding winding such that, during undisrupted operation, only a portion of the remote feed current necessary for holding the switching relay flows in the holding winding, and the remainder of the current flows through the diodes. By so doing, even given unfavourable conditions, the holding coil will not be briefly excited to such an extent (by current pulses as a result of dynamic events following a line interruption due to the drop out of neighboring switch auxiliaries occurring at different speeds) that the break contact temporarily opens during the high discharge current through the cross-arm and is thereby loaded beyond its making and/or breaking capacity.

DESCRIPTION OF THE PREFERRED EMBODIMENTS

Figure 1:
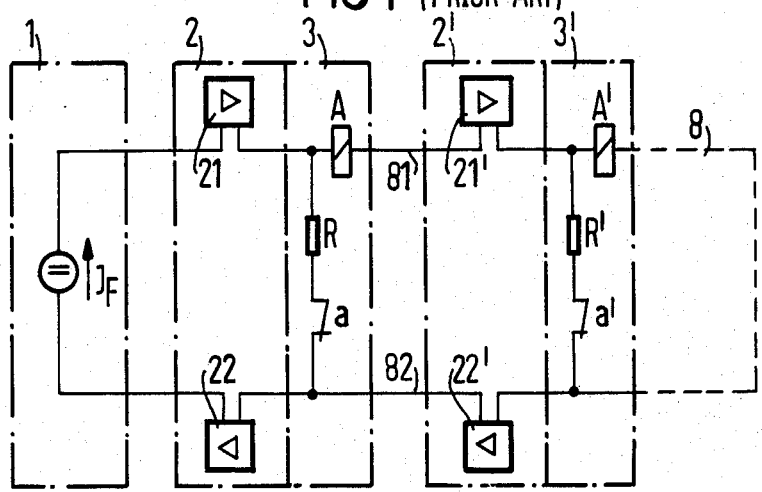
FIG. 1 is a circuit diagram for a conventional device for DC series feed of intermediate locations of a communication transmission device.

A conventional remote feed device is shown in FIG. 1 of the type for supplying a DC series feed to intermediate locations of a communication transmission system. The device includes a feed location 1 which, as a constant current source, supplies an impressed remote feed current $I_F$ to a remote feed loop 8. A plurality of intermediate locations containing repeaters or regenerators are fed via the remote feed loop 8. Although any number of such intermediate locations may be present, only an intermediate location 2 with a switch auxiliary 3 and an intermediate location 2' with a switch auxiliary 3' are shown in FIG. 1. Each intermediate location contains two repeaters, respectively allocated to each transmission direction. Both repeaters may, however, under certain conditions be provided for the same transmission direction. The current supply inputs of the repeaters of an intermediate location in the example shown in FIG. 1 are disposed in different current paths 81 and 82 of the remote feed loop 8. The switch auxiliary 3 (and the switch auxiliary 3') is disposed at that side of the repeater away from the feed location 1. The excitation winding for the switching relay A (and the relay A') is connected in the remote feed current path 81 of the continuing portion of the remote feed loop 8. The excitation winding for the switching relay A (or the switching relay A') is connected in the remote feed current path 81 of the continuing part of the remote feed loop 8. The break contact a for the switching relay A is in series with a resistor R and the break contact a' for the switching relay A' is in series with a resistor R' in a cross-arm which, viewed from the feed location 1, is disposed behind the repeaters or regenerators 21 and 22 (or 21' and 22') and in front of the excitation winding for the relay A (or A'). The remote feed circuit proceeds via the inner conductor of the coaxial cable of a four-wire transmission link or in a remote feed cable such as, for example, light waveguide transmission links. In this instance (not shown in greater detail in FIG. 1), the repeaters or regenerators may be provided with remote feed separating filters for separating the remote feed loop and signal transmission paths from one another in the intermediate location and subsequently recombining the two.

Figure 2:
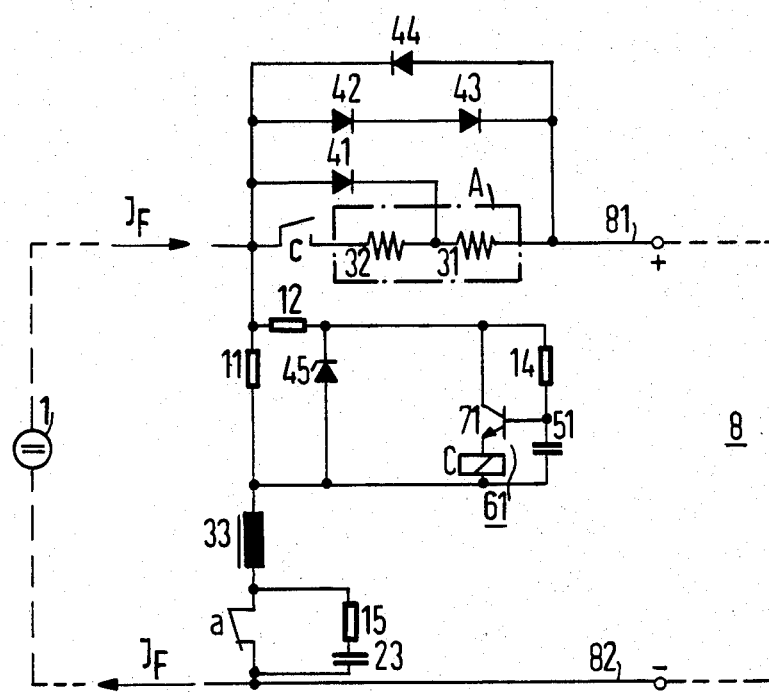
FIG. 2 is a circuit diagram for a switch auxiliary for remotely fed intermediate repeater locations with a switching relay and two auxiliary relays constructed in accordance with the principles of the present invention.

A switch auxiliary suitable for use in a device of the type shown in FIG. 1 which has the above-discussed advantages of utilizing space-saving small relays and chokes, is shown in FIG. 2.

In the sample embodiment shown in FIG. 2, the relay A is the component which operates to close the backup remote feed loop. Upon the occurrence of a line interruption, the break contact a connects the two remote feed current paths 81 and 82 to each other via a resistor 11 and a choke 33.

The response winding 32 of the relay A can be switched on by means of a first auxiliary relay C, which is connected to the resistor 11 of the cross-arm via a first delay circuit 61. The delay circuit 61 includes an RC series connection (consisting of resistor 14 and capacitor 51) and the emitter of a transistor 71. The collector of the transistor 71 is connected to the resistor-side terminal of the RC series connection 14, 51 and is connected at its base to the junction between the resistor 14 and the capacitor 51 of that RC series combination.

A circuit for voltage stabilization including a Zener diode 45, connected via a resistor 12 to the resistor 11 of the cross-arm, is connected between the resistor 11 of the cross-arm and the delay circuit 61. The resistor 12 serves as a protection against excessively high current pulses for the Zener diode 45 which supplies a constant operating voltage for the delay circuits.

A "make" contact c of the first auxiliary relay C is disposed in series with the response winding 32 for the purpose of switching on the response winding 32. A series connection consisting of the "make" contact c and the response winding 32 is bridged by a diode 41 having a plurality disposed in the conducting direction for the remote feed current $I_F$. It is assumed that the voltage drop of the response current at the resistor of the response winding is sufficiently lower than the threshold voltage for the diode 41. Given a necessarily higher voltage drop, the diode 41 must be replaced by two or more threshold devices so that the entire response current flows through the winding 32 given a closed contact c. The diode branch including the diode 44 and the diode branch including the diodes 42 and 43 (connected with reverse polarity with respect to that of the diode 44) are connected in parallel to a series connection formed by the holding winding 31 and the response winding 32 of the switching relay A and the "make" contact c of the first auxiliary relay C. The diodes 42, 43 and 44 protect the relay winding against excessively high current pulses on the line which may be caused by lightning or induced by excess voltages in the cable.

The diode branch including the diodes 42 and 43 (arranged with polarity in the conducting direction for the remote feed current $I_F$) includes a plurality of diode paths such that, at the rated value for the remote feed current $I_F$, the voltage at the holding winding 31 of the switching relay A is limited by the diodes 42 and 43. It is thus preferable to select the resistor for the holding windings such that, given undisrupted operation, only a portion of the remote feed current (necessary for holding the relay) flows through the holding winding, with the remaining portion flowing through the diodes. By so doing, one avoids so greatly exciting the holding coil (such as by current pulses as a result of dynamic events due to the drop out of neighboring switch auxiliaries occurring at different rates) to an extent that the contact temporarily opens during the high discharge over the cross-arm, and as a result is loaded beyond its making and/or breaking capacity.

The choke 33 functions as a contact protection when closing the break contact a. The choke 33 first assumes a high remote feed voltage (positive or negative) which may exist between the remote feed paths 81 and 82 and proceeds into saturation only, for example, after a few hundred microseconds when the break contact has been reliably closed.

The winding change-over undertaken at the switching relay A avoids an over-excitation and guarantees disruption-free cooperation of the switch auxiliaries on the line. It further allows a simple "make" contact to be employed for adding the response winding 32 to the circuit. As shown in FIG. 2, the response winding 32 of the relay A is switched in series with the retaining winding 31 by means of the contact c. After response of the switching relay A, this connection is cleared, that is, the remote feed current then flows via the diode by-pass 41 directly to the holding winding 31.

The assistance of the delay circuit 61 preceding the auxiliary relay C ensures that the addition of the response winding of the switching relay A can only occur when the remote feed line has been completely discharged. Current pulses which may occur during discharge of the remote feed link therefore do not cause a response of the switching relay A.

The series connection of the resistor 15 and the capacitor 23, connected in parallel to the contact a, serves as a contact protection when closing the break contact a.

Figure 3:
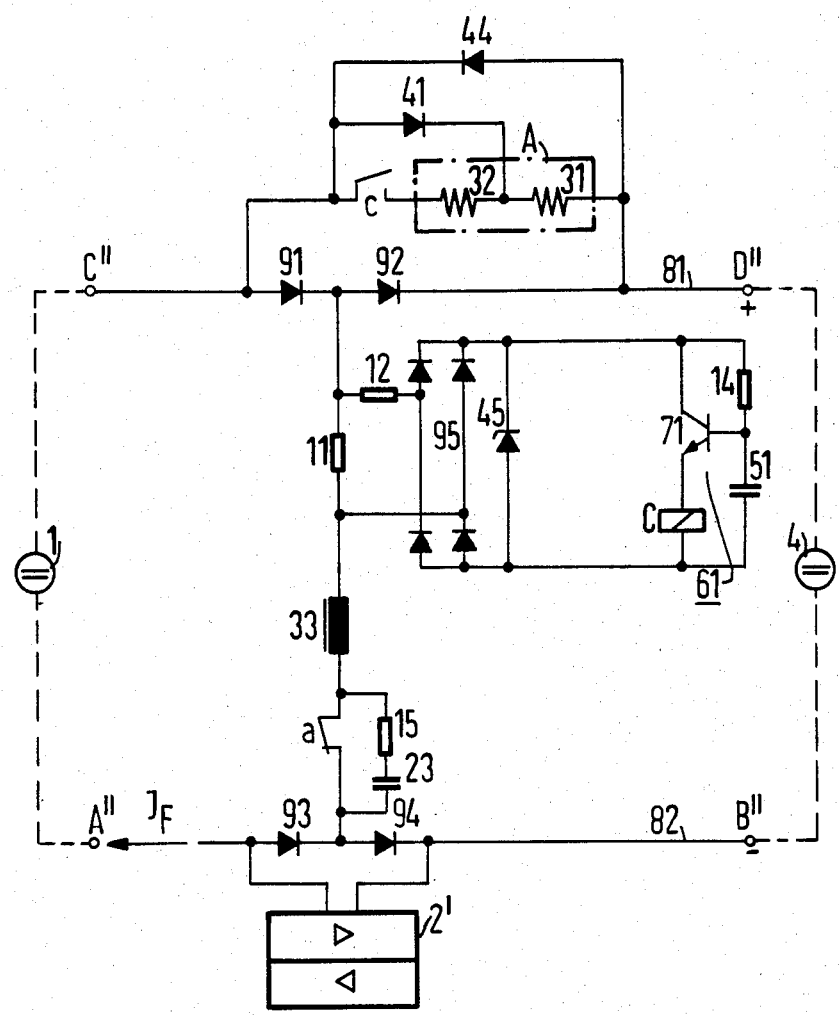
FIG. 3 is a circuit diagram for a switch auxiliary for remote feed circuits fed at both sides constructed in accordance with the principles of the present invention.

The switch auxiliary shown in FIG. 3 constructed in accordance with the principles of the present invention is suitable for remote feed circuits which are fed from both sides by means of two constant current sources 1 and 4. The embodiment shown in FIG. 3 also enables the repeaters or regenerators being fed to be alternately connected with each of the remote feed current paths from intermediate location to intermediate location in order to obtain a uniform load distribution or to achieve compensation of the influences of induced alternating currents on the line.

The switch auxiliary shown in FIG. 3, is connected into the remote feed circuit with the terminals A" and C" at one side and terminals B" in D" at the other side.

The terminals A" and B", to which the repeater 2' is connected, are connected via a series connection consisting of diodes 93 and 94 having polarity in a blocking direction relative to the remote feed current. A parallel connection, consisting of a series connection of diodes 91 and 92 (having polarity in the conducting direction relative to the remote feed current) and a series connection of the contact c and the windings 32 and 31, is connected between the terminals C" and D". The resistance of the winding 31 is preferably dimensioned such that, during undisrupted operation, no more current than is required for holding flows through the winding 31 in cooperation with the diodes 91 and 92. The cross-arm of the switch auxiliary is disposed between the junctions of the two diodes 91 and 92 and the junction of the diodes 93 and 94.

Also, departing from FIG. 2, a diode rectifier bridge 95 is, in the embodiment of FIG. 3, connected between the resistor 11 and the delay circuit 61. This rectifier bridge 95 is preceded by the resistor 12 and followed by the Zener diode 45.

If a plurality of diode paths are required for the diode branch 41, a correspondingly greater number of threshold devices may be provided in the diode branches 91 and 92.

Figure 4:
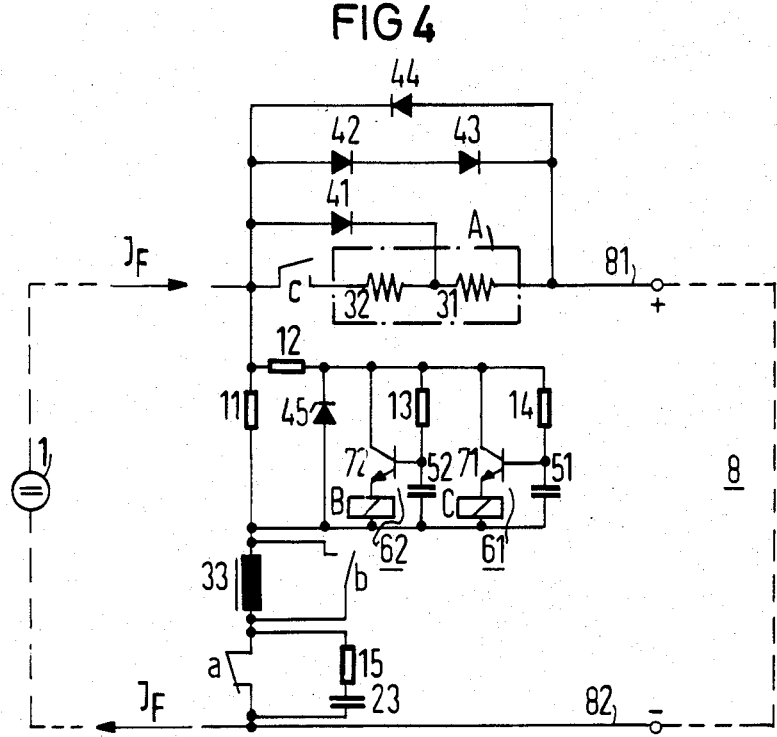
FIG. 4 is a circuit diagram for a switch auxiliary as shown in FIG. 2 with additional auxiliary relays.

The switch auxiliary shown in FIG. 4 substantially coincides with that shown in FIG. 2, however, in addition to the first auxiliary relay c and the first delay circuit 61, a second auxiliary relay B is provided which is connected via a second delay circuit 62 to the resistor 11 of the cross-arm and which has a "make" contact in parallel to the choke 33.

The delay circuit 62 includes an RC element consisting of a resistor 13 and a capacitor 52, and a transistor 72. The auxiliary relay B allocated to the delay circuit 62 is connected between the capacitor-side terminal of the RC element (consisting of resistance 13 and capacitance 52) and the emitter of the transmitter 72. The collector of the transistor 72 is connected to the resistor-side terminal of the RC element and its base is connected to the junction between the resistor 13 and the capacitor 52 of the RC element. The delay time of the first delay circuit 61 is greater than the delay time of the second delay circuit 62.

The circuit for voltage stabilization with the Zener diode 45 (connected via the resistor 12 to the resistor 11 of the cross-arm) is connected between the resistor 11 of the cross-arm and the delay circuits 61 and 62. The resistor 12 serves as a protection against excess current pulses for the Zener diode 45 which supplies a constant operating voltage for the delay circuits.

The choke 33 first accepts the high remote feed voltage (positive or negative) which may exist between the remote feed paths 81 and 82 and only proceeds into saturation when the break contact a has reliably closed. After the line discharge has occurred via the cross-arm of the switch auxiliary, the choke 33 is shorted via the contact b of the auxiliary relay B driven with a corresponding delay. The choke 33 is therefore only bridged after passage of the line discharge current, that is, after the conclusion of its protective function. Thus, an unnecessary leakage power at the choke 33 is avoided by the remote feed current now flowing via the cross-arm, and demagnetization of the saturated choke is also initiated.

The use of the delay circuit 61 connected to the auxiliary relay C ensures that re-operation of the switching relay A takes place only when the choke 33 has demagnetized via the shorted contact b and is thus again able to assume its protective function. A relay having a particularly small making and/or breaking capacity can therefore be employed as the switching relay A.

Consistent with the above discussion, the additional component outlay connected with the auxiliary relay and delay circuits has substantially no influence on the outage rate of the switch auxiliary because all of these components are current-free and voltage-free during undisrupted operation of the transmission link, and all contacts are in the form of continously open single contacts. Outages of the additional components required for the delay circuits will thus not result in disruption in the message transmission.

Figure 5:
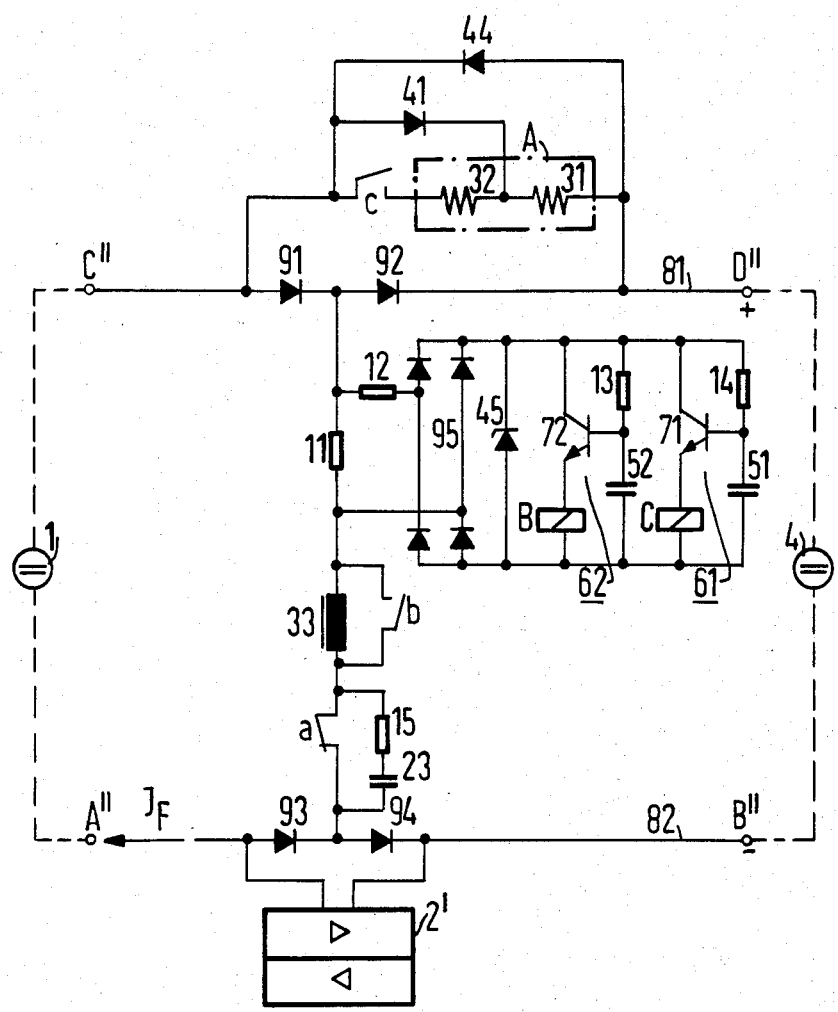
FIG. 5 is a circuit diagram for a switch auxiliary as shown in FIG. 3 with additional auxiliary relays.

Another embodiment of a switch auxiliary, substantially corresponding to that shown in FIG. 3, is illustrated in FIG. 5. In the embodiment of FIG. 3, however, a diode rectifier bridge 95 is connected between the resistor 11 and the delay circuits 61 and 62. This rectifier bridge 95 is preceded by the resistor 12 and followed by the Zener diode 96. In the embodiment shown in FIG. 5, the contact b is particularly advantageous because it is this contact b which ensures demagnetization of the choke 33 for both current directions.

The circuit disclosed and claimed herein can be employed to advantage in feed locations for reducing the output voltage to a harmless level in instances of interruption in the outgoing remote feed current paths.

Although modifications and changes may be suggested by those skilled in the art, it is the intention of the inventors to embody within the patent warranted hereon all changes and modifications as reasonable and properly come within the scope of their contribution to the art.

We claim as our invention:

1. A circuit for use in a remote feed loop transmission system for feeding electrical users by means of DC series feed, said circuit automatically closing an interruption in said remote feed loop in front of the interrupt location, said circuit comprising:
   a longitudinal arm including a holding winding and a response winding of a switching relay, said response winding being effective in said circuit given non-actuation of said switching relay and being non-effective in said circuit given actuation of said switching relay, said switching relay being actuated by the maintenance of current in said remote feed loop above a predetermined value and being non-actuated if a prescribed fraction of a rated value of said remote feed loop current falls below said predetermined value;
   a cross-arm including a break contact of said switching relay connected in series with a choke and a resistor;
   a means for energizing said response winding of said switching relay including a first auxiliary relay, a resistor, and a first delay circuit interconnected between said first auxiliary relay and said resistor, said first auxiliary relay having a make contact connected in series with said response winding; and
   a diode bridging said make contact of said first auxiliary relay and said response winding and having a polarity arranged for conducting in the direction of said remote feed loop current.

2. A circuit as claimed in claim 1 wherein said means for energizing said response winding further includes a second auxiliary relay having a make contact, a second delay circuit interconnected between said make contact of said second auxiliary relay and said resistor and connected in parallel to said choke, said first delay circuit having a delay time which is greater than a delay time of said second delay circuit.

3. A circuit as claimed in claim 2 wherein said first and second auxiliary relays are each relays having a dual-in-line housing.

4. A circuit as claimed in claim 2 wherein at least one of said first or second delay circuits includes an RC element and a transistor and wherein the auxiliary relay connected to the delay circuit is connected between the capacitor side of said RC element and the emitter of said transistor, and wherein said transistor has a collector connected to the resistor side of said RC element and a base connected to a junction between a resistor and a capacitor comprising said RC element.

5. A circuit as claimed in claim 2 further comprising a voltage stabilizing means including a Zener diode connected to said resistor in said cross-arm through a further resistor and connected to at least one of said first or second delay circuits.

6. A circuit as claimed in claim 2 wherein said remote feed loop has two remote feed current paths with capacitances effective therebetween, and wherein said second delay circuit has a time delay dimensioned such that said second auxiliary relay connected thereto is energized only after conclusion of discharge through said capacitances between said remote feed current paths.

7. A circuit as claimed in claim 2 wherein said cross-arm conducts current in both directions and further comprising a rectifier bridge circuit interconnected between said cross-arm and said delay circuits.

8. A circuit as claimed in claim 1 wherein said means for energizing said response winding of said switching relay further comprises first and second diode branches connected in parallel with opposed polarity across said holding winding and said response winding of said switching relay and said make contact of said first auxiliary relay, one of said diode branches having a polarity corresponding to the conducting direction of said remote feed loop current and containing a plurality of diode paths such that the voltage across said holding winding of said switching relay is limited by said one diode branch at said rated value of said remote feed loop current.

9. A circuit as claimed in claim 1 wherein said switching relay further comprises a break contact, and wherein said choke is dimensioned such that said choke becomes saturated only after said break contact of said switching relay has reliably closed.

10. A circuit as claimed in claim 1 wherein said first delay circuit has a delay time dimensioned such that said first auxiliary relay connected thereto is energized only after demagnetization of said choke.

* * * * *